(12) United States Patent
Ackermann et al.

(10) Patent No.: US 9,882,506 B2
(45) Date of Patent: Jan. 30, 2018

(54) MULTIPLE INDUCTIVE COMPONENT

(71) Applicant: PHILIPS LIGHTING HOLDING B.V., Eindhoven (NL)

(72) Inventors: Bernd Ackermann, Aachen (DE);
Reinhold Elferich, Aachen (DE);
David Llewellyn John, Willingham (GB)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 29 days.

(21) Appl. No.: 14/781,094

(22) PCT Filed: Mar. 17, 2014

(86) PCT No.: PCT/IB2014/059887
§ 371 (c)(1),
(2) Date: Sep. 29, 2015

(87) PCT Pub. No.: WO2014/155235
PCT Pub. Date: Oct. 2, 2014

(65) Prior Publication Data
US 2016/0049881 A1 Feb. 18, 2016

Related U.S. Application Data

(60) Provisional application No. 61/806,456, filed on Mar. 29, 2013.

(51) Int. Cl.
*H01F 17/06* (2006.01)
*H02M 7/06* (2006.01)
(Continued)

(52) U.S. Cl.
CPC ............. *H02M 7/06* (2013.01); *H01F 3/14* (2013.01); *H01F 17/045* (2013.01); *H01F 17/06* (2013.01);
(Continued)

(58) Field of Classification Search
CPC ............................................. H01F 27/00–27/30
(Continued)

(56) References Cited

U.S. PATENT DOCUMENTS 2,435,630 A * 2/1948 Ketcham ............... H03H 7/0184
334/76
2,640,966 A * 6/1953 Drouin ................. G01D 5/2216
336/134

(Continued)

FOREIGN PATENT DOCUMENTS

CN 101741261 A 6/2010
CN 102090145 A 6/2011
(Continued)

*Primary Examiner* — Tuyen Nguyen
(74) *Attorney, Agent, or Firm* — Akarsh P. Belagodu

(57) ABSTRACT

A multiple inductive component (100) comprises:—a cylindrical drum core component (120) with at least two axially spaced circumferential grooves (131, 132) in its cylindrical outer surface (121), a separation disc portion (111) between said two circumferential grooves and two outer disc portions (112, 113) at the sides of the said two circumferential grooves, respectively, directed away from the separation disc portion;—at least one first winding (141) arranged in a first one (131) of said grooves;—at least one second winding (142) arranged in a second one (132) of said grooves;—a cylindrical shell core component (150) arranged coaxially around the cylindrical drum core component;—two outer air gaps (162, 163) between the cylindrical shell core component and said two outer disc portions, respectively. The separation disc portion is magnetically short circuited with the cylindrical shell core component.

20 Claims, 7 Drawing Sheets

(51) Int. Cl.
*H01F 3/14* (2006.01)
*H01F 17/04* (2006.01)
*H01F 27/26* (2006.01)
*H01F 27/24* (2006.01)
*H01F 27/28* (2006.01)
*H02M 1/42* (2007.01)
*H05B 33/08* (2006.01)

(52) U.S. Cl.
CPC .............. *H01F 27/24* (2013.01); *H01F 27/26* (2013.01); *H01F 27/2823* (2013.01); *H02M 1/42* (2013.01); *H05B 33/0815* (2013.01)

(58) Field of Classification Search
USPC ...................................... 336/212, 178, 65, 83
See application file for complete search history.

(56) References Cited

U.S. PATENT DOCUMENTS

| | | | |
|---|---|---|---|
| 3,101,462 A * | 8/1963 | Swainson | G01D 5/2283 336/133 |
| 4,117,436 A * | 9/1978 | MacLennan | H01F 38/18 336/117 |
| 4,400,674 A * | 8/1983 | Suda | H01F 17/043 336/192 |
| 4,439,699 A * | 3/1984 | Brende | H02K 41/0356 310/13 |
| 4,904,971 A * | 2/1990 | Jin | H01F 6/00 335/216 |
| 5,994,992 A * | 11/1999 | Yamada | H01F 37/00 336/198 |
| 7,009,482 B2 | 3/2006 | Kiko et al. | |
| 7,936,244 B2 | 5/2011 | Hansen | |
| 2003/0197585 A1 | 10/2003 | Chandrasekaran et al. | |
| 2004/0150500 A1 | 8/2004 | Kiko | |
| 2011/0063065 A1* | 3/2011 | Hugues Douglas | H01F 3/10 336/170 |

FOREIGN PATENT DOCUMENTS

| | | |
|---|---|---|
| EP | 1883083 A1 | 1/2008 |
| JP | 555105926 U | 7/1980 |
| JP | 2003133139 A | 5/2003 |

* cited by examiner ly small air gap between them, while a larger air gap 18 is present between the central legs 14. The air gaps in the outer legs are negligibly small whilst the air gap 18 in the central leg 14 is intentionally made larger.

MULTIPLE INDUCTIVE COMPONENT

CROSS-REFERENCE TO PRIOR APPLICATIONS

This application is the U.S. National Phase application under 35 U.S.C. § 371 of International Application No. PCT/IB14/059887, filed on Mar. 17, 2014, which claims the benefit of U.S. Provisional Patent Application No. 61/806,456, filed on Mar. 29, 2013. These applications are hereby incorporated by reference herein.

FIELD OF THE INVENTION

The present invention relates in general to the design of an inductive component such as for instance an inductor or a transformer.

BACKGROUND OF THE INVENTION

The use of inductors and transformers in electrical circuits is widely known. Different types of design exist. In a much-used design, the inductor comprises a spiral winding of an electrically conductive wire, for instance a copper wire. When current passes such winding, an electromagnetic field is generated, having field lines that basically follow the winding's center line and form closed loops by curving back outside the winding, so that the field lines in longitudinal cross section resemble the shape of an 8. The flux of the field is proportional to the current magnitude I. The energy stored in the electromagnetic field can be expressed as $E=0.5 \cdot L \cdot I^2$, with L being the inductance of the inductor. For increasing the inductance of a given winding, or for reducing the volume of the inductor while maintaining the inductance, it is known to use a core of a high permeability material to guide and concentrate the field lines. It is possible to have a bar core in the center of the winding, but it is also possible to have a core that follows the entire length of the field lines and thus has a cross-sectional shape resembling the cipher 8.

FIGS. 1A and 1B are schematic longitudinal cross-sections illustrating two implementations of a conventional design of an inductive component 10, 20 including a soft magnetic core. In this respect, reference is made to Chapter 26 "Passive Components and Practical Converter Design Considerations" in Power Electronics: Converters, Applications, and Design by N. Mohan, T. M. Undeland, and W. P. Robbins, John Wiley & Sons, New York, 1989.

Soft magnetic cores usually consist of two core components separated by air gaps. In the case of FIG. 1A, the two core components 11 can be mutually identical and have a general E-shape with two outer legs 12, 13 and a central leg 14 connected together by a bar 15. The winding 16 is made on a plastic bobbin 17, and then the two core components 11 are placed together with their respective legs 12, 13 facing each other and with the bobbin 17 in between. The central legs 14 are slightly shorter than the outer legs 12, 13, so that the outer legs can touch each other or have only a very small air gap between them, while a larger air gap 18 is present between the central legs 14. The air gaps in the outer legs are negligibly small whilst the air gap 18 in the central leg 14 is intentionally made larger.

It is noted that soft magnetic cores are available in a wide variety of shapes, sizes, and magnetic materials. Likewise, bobbins are also available in a wide variety of shapes and sizes. It is further noted that the winding typically consists of a wire made from copper or aluminium. The wire may be solid wire, but Litz wire and foil are also used. The bobbin is provided with metal pins to which the terminals of the wire are soldered. These metal pins are used to mount the inductor on a printed circuit board via surface-mount or through-hole connection.

In the case of FIG. 1B, one core component 21 is implemented as an inner drum while the other core component 22 is implemented as an outer cylinder shell fitting around the drum. The drum 21 has a general I-shaped cross section, having a central body 23 and two outer discs 24, 25 having a diameter larger than the central body 23; this can also be described as a cylindrical drum 21 having a circumferential groove or recess 26. The inner diameter of the cylinder shell 22 is larger than the outer diameter of the drum 21, so that air gaps 28, 29 exist between the shell 22 and the respective outer discs 24, 25. The winding 27 is made in the groove 26 of the drum 21, and then the cylinder shell 22 is applied around the drum 21.

In the examples of FIGS. 1A and 1B, the inductive component 10, 20 comprises one single winding 16, 27. In such case, the component is an inductor. It is also possible that the inductive component comprises two or more windings arranged in the same bobbin 17 or the same groove 26, respectively: in such case, the two or more windings are magnetically coupled. Such design is useful for instance for implementing two or more coupled inductors, or for implementing a transformer.

It is generally desirable to reduce the volume of electronic components. This applies especially to inductors, as they tend to be the larger components in an electronic circuit. It applies most specifically to electronic circuits that need to be mounted in small spaces, for instance LED retrofit lamps. LED retrofit lamps are lamps that are intended to be mounted to replace for instance an incandescent lamp, and even may have an outer appearance resembling an incandescent lamp, but internally they comprise one or more LEDs and an LED driver. In a typical example, an LED retrofit lamp comprises a bulb portion and a bayonet-type base or Edison screw-type base having an LED driver arranged in the base. Such LED driver receives standard AC mains, in Europe typically 230 VAC @ 50 Hz, and must convert the AC mains voltage to DC LED current. A converter type widely used in such driver is a switch-mode converter. It is noted that switch-mode converters are known per se so that an explanation of the design of a switch-mode converter will be kept brief. By way of example, reference is made to parts 2, 3 and 5 in Power Electronics: Converters, Applications, and Design by N. Mohan, T. M. Undeland, and W. P. Robbins, John Wiley & Sons, New York, 1989.

FIG. 2 is a simplified circuit diagram illustrating some of the basic components of a possible implementation of a two-stage switch-mode converter.

The switch-mode converter 30 of FIG. 2 comprises a rectifier stage 31 for rectifying the mains voltage Vac. A boost PFC stage 32 comprises a first inductor 34, a first diode D1 and a first switch 51. The first switch 51 is controlled to maintain an intermediate voltage Vi at a buffer capacitor 36. A buck DC/DC converting output stage 33 converts the DC intermediate voltage Vi to DC load current. This output stage 33 comprises a second switch S2 and a second inductor 35 in series with the load L, and a second diode D2 parallel to the load L and the second inductor 35. The load is here shown as a resistor 37 but this will in LED retrofit lamps be replaced by one or more LEDs.

The key issue as far as the present invention is concerned, is that such switch-mode converter comprises two (or more) inductors, which makes the desirablility to reduce the volume of the inductors even more stringent.

Usually, each inductor is built as a separate component, i.e. a separate entity. It is already known that it is possible to reduce the combined volume of two inductors if these two inductors are built as one combined component, including two separate windings on one common drum core. FIG. 3 is a schematic longitudinal cross section comparable with FIG. 1B, illustrating the general design of such dual inductive component.

Comparable to the inductive component 20 of FIG. 1B, the dual inductive component 40 of FIG. 3 comprises one core component 41 implemented as a cylindrical drum while the other core component 42 is implemented as a cylinder shell fitting around the drum. When the windings are in place, the cylinder shell 42 is applied around the drum 41, extending the full length of the drum 41. Different from the embodiment of FIG. 1B, the cylindrical drum 41 has two spaced apart circumferential grooves or recesses 43, 44, with respective windings 45, 46 arranged in the respective grooves. The cylindrical drum 41 has a first outer disc 47, a second outer disc 48, and a central disc 49 between the two grooves 43, 44. A first air gap 51 is present between the first outer disc 47 and the cylinder shell 42, a second air gap 52 is present between the second outer disc 48 and the cylinder shell 42, and a central air gap 53 is present between the central disc 49 and the cylinder shell 42.

SUMMARY OF THE INVENTION

In a first approximation, the magnetic field lines F of a winding 46 are fully accommodated in the outer disc portion 48 and the central disc portion 49 at opposite sides of this winding 46, as illustrated in FIG. 4A.

However, in practice, the magnetic field lines of one winding 46 will not confine themselves to the central disc portion 49 but, to some extent, will also use the opposite outer disc 47, as illustrated in FIG. 4B.

This means that some of the magnetic field lines F2 of one winding 46 will also embrace the other winding 45, which results in a significant magnetic coupling between the two windings. This is undesirable in situations where the two windings form inductors that are intended to operate independently from each other, such as in the case of the inductors 34, 35 of the switch-mode converter 30 of FIG. 2.

An object of the present invention is to provide a dual inductor in which the above disadvantage has been eliminated or at least reduced.

Without wishing to be bound by any explanatory theory, the present invention is based on the understanding that in the prior art implementation, the outer diameter of said central disc portion 49 is equal to the outer diameters of the outer discs 47, 48, so that the three air gaps 51, 52, 53 between the cylinder shell core component 42 and the drum core component 41 all have mutually the same width. These air gaps 51, 52, 53 can be considered as presenting a resistance to the field lines, while the core material hardly provides any resistance. Thus, considering the current flowing in the lower winding 46, the resulting field lines F, F2 basically experience the resistance of two air gaps 51, 53 arranged in parallel, and distribute themselves according to the resistance ratio.

Based on this understanding, the present invention proposes to design a dual inductive component such that the air gap between the central drum disc portion and the cylinder shell core component is smaller than the air gap between the outer discs and the cylinder shell core component.

In one advantageous embodiment, a third separate annular core component is arranged in the air gap between the central drum core portion and the cylinder shell core component.

In another advantageous embodiment, the cylinder shell core component is provided with a central elevation at its inner surface.

In yet another advantageous embodiment, the central drum core portion is made with a radius larger than the respective outer discs. Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, in which indications "below/above", "upper/lower", "left/right" etc only relate to the orientation displayed in the drawings, and in which.

DETAILED DESCRIPTION OF THE INVENTION

Figure 5:
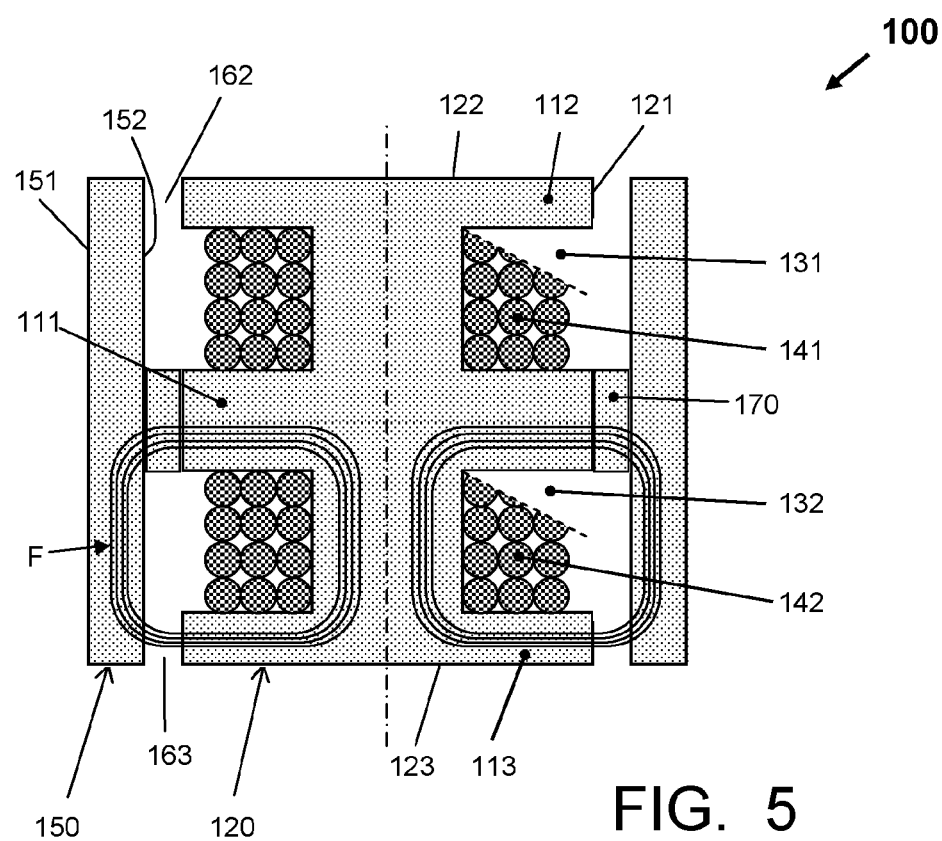
FIG. 5 schematically shows a first embodiment of a dual inductive component according to the present invention.

FIG. 5 schematically shows a first embodiment of a dual inductive component 100 according to the present invention.

The dual inductive component 100 comprises a cylindrical drum core component 120 with a cylindrical outer surface 121, an upper surface 122 and a lower surface 123. In its cylindrical outer surface 121, the cylindrical drum core 120 comprises two circumferential grooves or recesses 131, 132, which define accommodation spaces for accommodating two windings 141, 142, respectively. The grooves 131, 132 may mutually have the same depth, but that is not essential. The grooves 131, 132 may mutually have the same axial width, but that is not essential. The two windings 141, 142 may mutually have the same number of turns, but that is not essential.

The portion of the cylindrical drum core component 120 between the grooves 131, 132 will be indicated as separation disc portion 111. The portion of the cylindrical drum core component 120 between the upper surface 122 and the uppermost groove 131 will be indicated as upper outer disc 112. The portion of the cylindrical drum core component 120 between the lower surface 123 and the lowermost groove 132 will be indicated as lower outer disc 113. The diameter of the lower outer disc 113 is typically equal to the diameter of the upper outer disc 112, but this is not essential.

The dual inductive component 100 further comprises a cylindrical shell core component 150 shown as having substantially the same axial length as the cylindrical drum core component 120. The cylindrical shell core component 150 has a cylindrical outer surface 151 and a cylindrical inner surface 152 having an inner diameter larger than the diameters of the upper outer disc 112 and of the lower outer disc 113. The cylindrical shell core component 150 is arranged coaxially around the cylindrical drum core component 120. An upper air gap 162 is present between the upper outer disc 112 and the cylindrical shell core component 150. A lower air gap 163 is present between the lower outer disc 113 and the cylindrical shell core component 150.

In this embodiment, the separation disc portion 111 has a diameter smaller than the inner diameter of the cylindrical shell core component 150. In fact, the diameters of the lower outer disc 113, the upper outer disc 112, and the separation disc portion 111 are advantageously mutually equal. The dual inductive component 100 in this embodiment further comprises an annular core component 170 having an axial length substantially equal to the axial length of the separation disc portion 111, having an inner diameter substantially equal to, or slightly larger than, the diameter of the separation disc portion 111, and having an outer diameter substantially equal to, or slightly smaller than, the inner diameter of the cylindrical shell core component 150. The annular core component 170 is arranged in the gap between the separation disc portion 111 and the cylindrical shell core component 150, effectively filling this gap with core material.

Figure 4A:
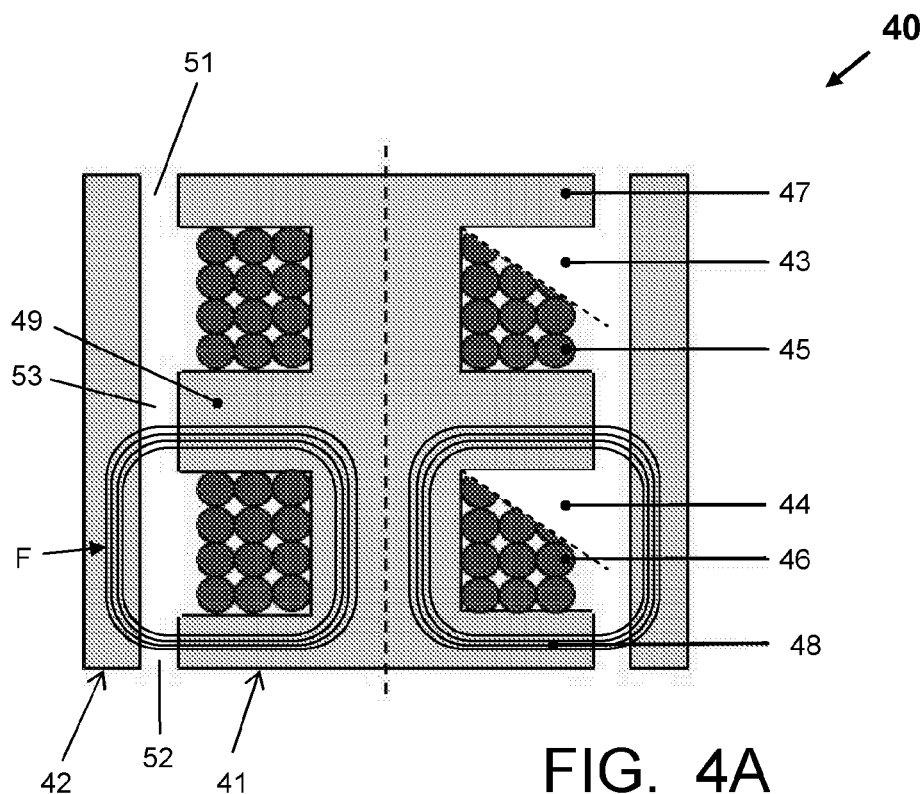
FIGS. 4A and 4B are schematic longitudinal cross-sections comparable to FIG. 3, also showing schematical magnetic field lines.
Figure 4B:
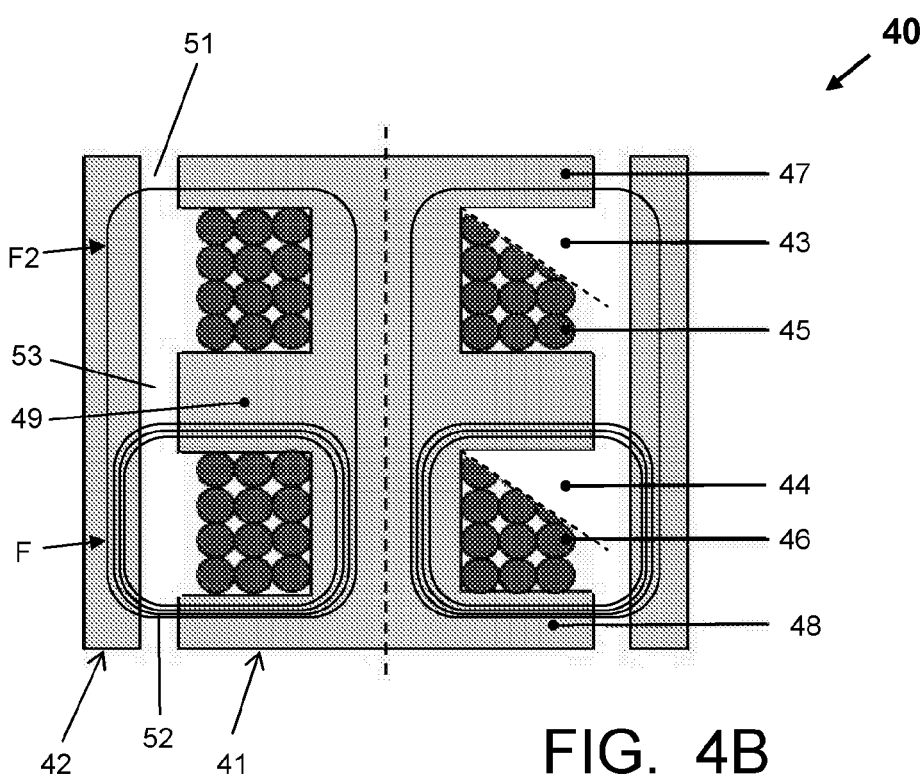

In contrast to the dual inductive component 40 of FIG. 4B, the central gap 53 is no longer present. Therefore, practically all magnetic field lines F of the lower winding 142 will be confined in the separation disc portion 111 and annular core component 170, and only very few or no magnetic field lines of the lower winding 141 will cross the upper air gap 162 and extend through the upper outer disc 112, and the same applies, mutatis mutandis, to the magnetic field lines of the upper winding 141. Thus, there will be hardly any or no magnetic coupling between the windings 141, 142 in the respective grooves 131, 132, and the two inductive components formed by these windings can operate fully independently.

It is noted that the outer discs 112, 113 may mutually have different diameters, and that one of these outer discs may even have a diameter larger than the separation disc, but at least one of the outer discs should have a diameter not larger than the diameter of the separation disc otherwise the annular core component 170 can not be mounted.

Figure 6:
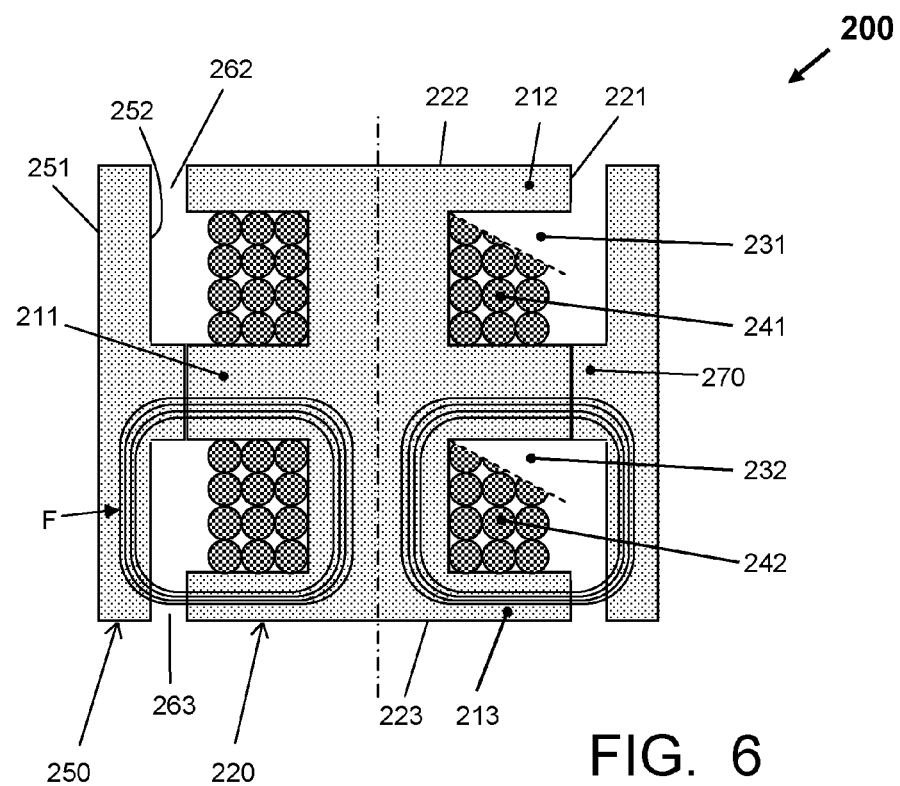
FIG. 6 schematically shows a second embodiment of a dual inductive component according to the present invention.

Thus, an important aspect of the present invention is that it is possible to arrange two separate windings 141, 142 on a common drum core 120 and at the same time allow these separate windings 141, 142 to operate mutually independently without magnetic coupling, by eliminating the gap between the drum core's separation disc portion 111 in between these windings 141, 142 and the cylindrical shell core component 150. Several alternatives are possible for closing this gap. In the case of the dual inductive component 100 of FIG. 5, the gap between the drum core's separation disc portion 111 and the cylindrical shell core component 150 is closed by placing an additional, annular core component 170 in this gap. FIG. 6 schematically shows a second embodiment of a dual inductive component 200 according to the present invention. Identical or similar parts are indicated with the same reference numerals as used in FIG. 5 for indicating parts of the first embodiment, yet increased by 100 to be in the 200 range, therefore the discussion of these parts will not be repeated.

In this second embodiment, the separation disc portion 211 has a diameter smaller than the inner diameter of the cylindrical shell core component 250. In fact, the diameters of the lower outer disc 213, the upper outer disc 212, and the separation disc portion 211 are advantageously mutually equal. In this embodiment, the cylindrical shell core component 250 on its inner surface, at a location corresponding with the location of the separation disc portion 211, is provided with a central annular projection 270 having an axial length substantially equal to the axial length of the separation disc portion 211, and having an inner diameter substantially equal to, or slightly larger than, the diameter of the separation disc portion 211. Thus, at the position of the separation disc portion 211, there is no air gap between the separation disc portion 211 and the cylindrical shell core component 250, or only a small air gap much smaller than the respective outer disc air gaps 262 and 263.

It is noted that the outer discs 212, 213 may mutually have different diameters, and that one of these outer discs may even have a diameter larger than the separation disc, but at least one of the outer discs should have a diameter not larger than the diameter of the separation disc otherwise the cylindrical shell core component 250 can not be mounted.

Figure 7:
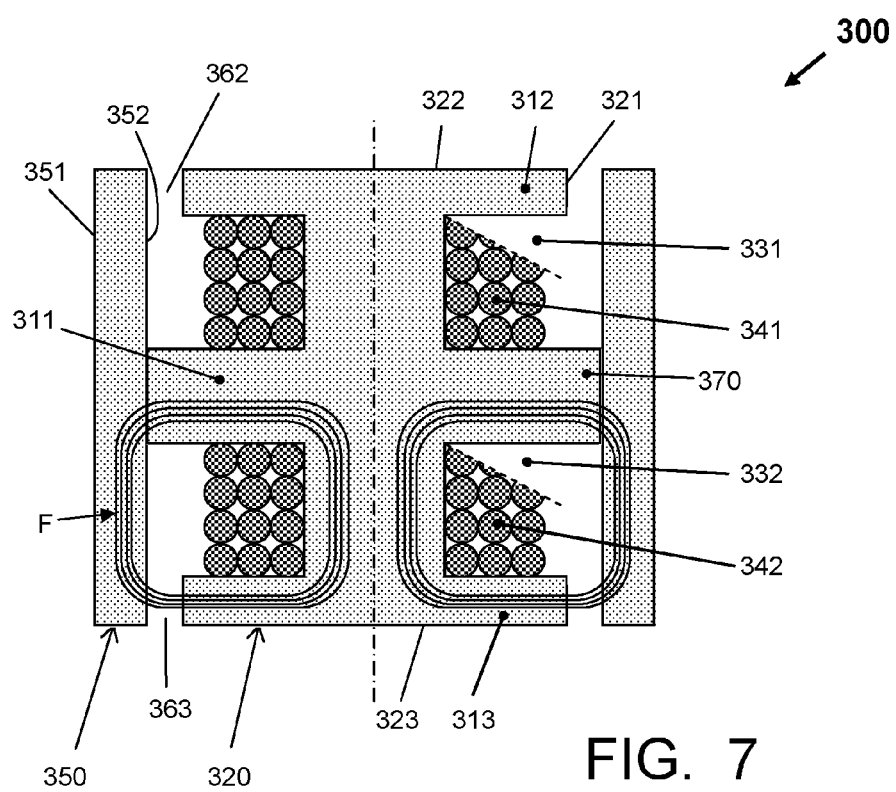
FIG. 7 schematically shows a third embodiment of a dual inductive component according to the present invention.

FIG. 7 schematically shows a third embodiment of a dual inductive component 300 according to the present invention. Identical or similar parts are indicated with the same reference numerals as used in FIG. 5 for indicating parts of the first embodiment, yet increased by 200 to be in the 300 range, therefore the discussion of these parts will not be repeated.

In this third embodiment, the cylindrical shell core component 350 advantageously may have a constant inner diameter over its entire length, as in the case of the first embodiment. In this third embodiment, the separation disc portion 311 has a diameter substantially equal to, or slightly smaller than, the inner diameter of the cylindrical shell core component 350. Thus, at the position of the separation disc portion 311, there is no air gap between the separation disc portion 311 and the cylindrical shell core component 350, or only a small air gap much smaller than the respective outer disc air gaps 362 and 363.

Figure 1A:
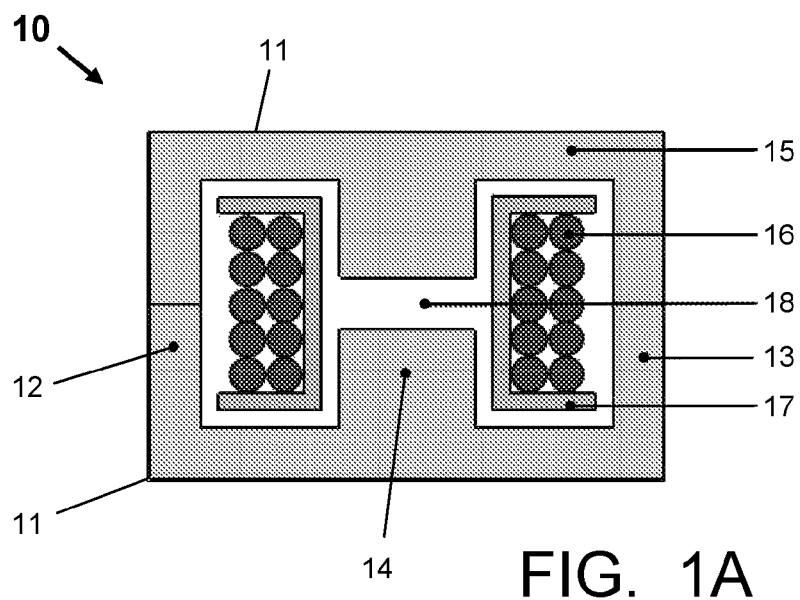
FIGS. 1A and 1B are schematic longitudinal cross-sections of two conventional inductive components.
Figure 1B:
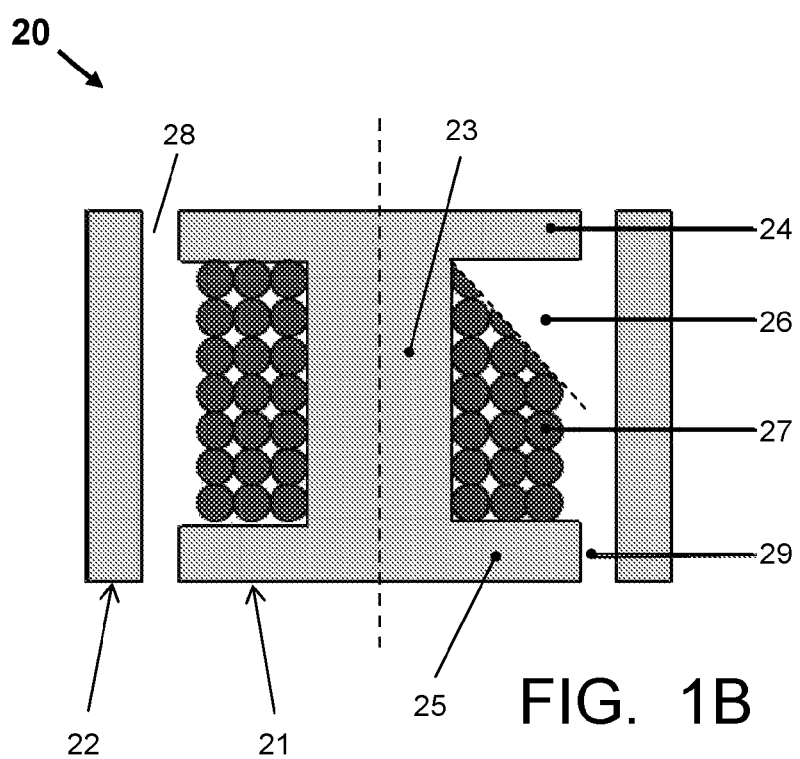
Figure 2:
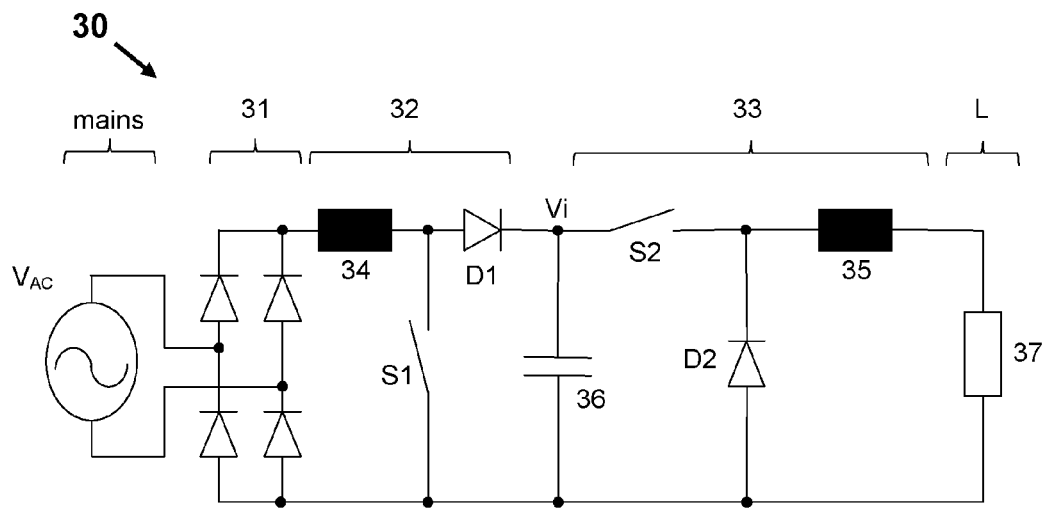
FIG. 2 is a simplified circuit diagram of a two-stage switch-mode converter.
Figure 3:
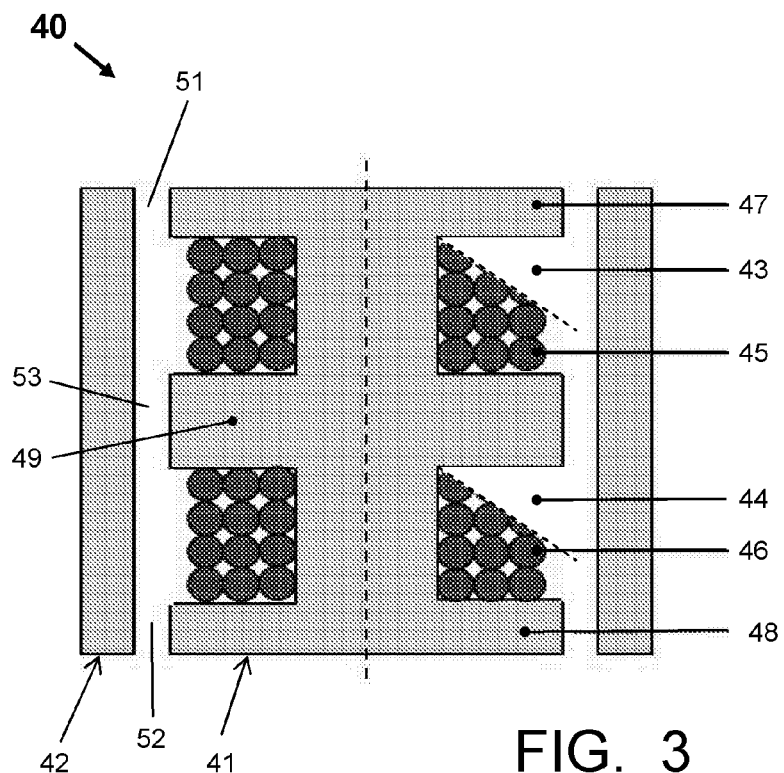
FIG. 3 is a schematic longitudinal cross-sections of a conventional dual inductive component.

In the above-discussed embodiments, there is always shown one winding in any groove. These windings can be used as inductors, which are magnetically decoupled with respect to each other despite the fact that they are arranged on a common core body, as already explained. The converter of FIG. 2 is an example of a circuit comprising two such independent inductors. However, the present invention is not limited to the case of a core body having just two grooves and two inductors.

Figure 8:
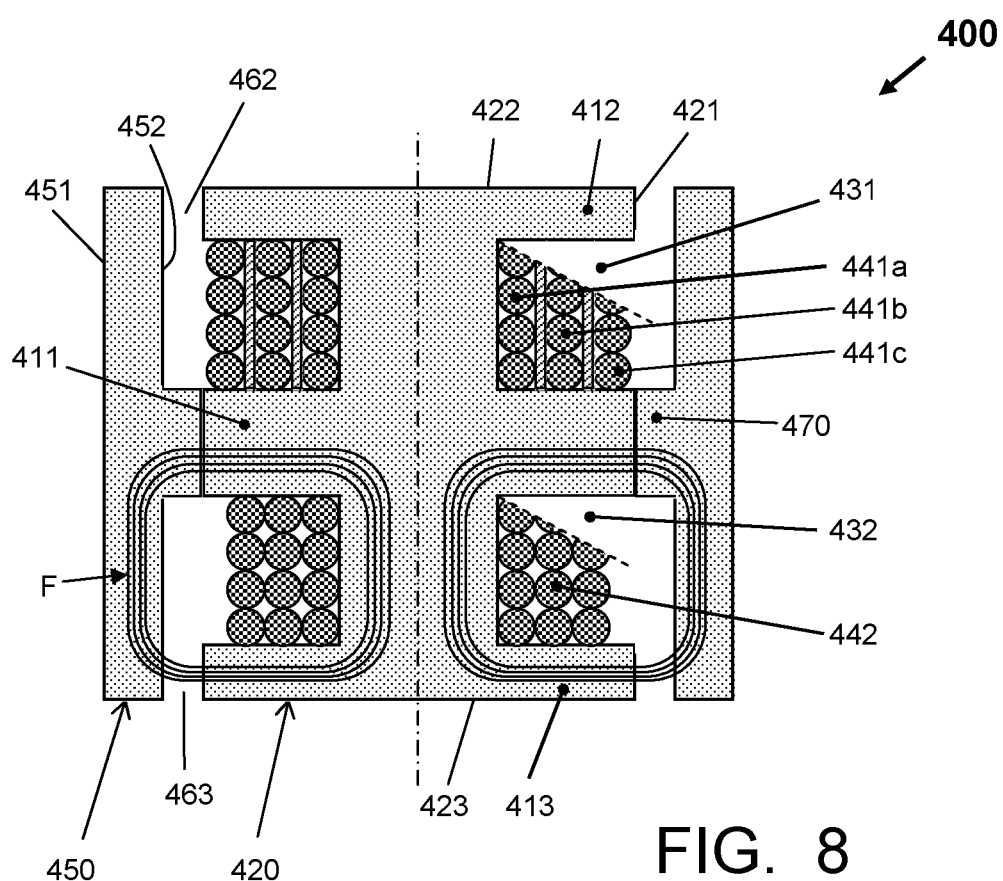
FIG. 8 schematically shows a fourth embodiment of a multiple inductive component according to the present invention.

In the first place, it is possible that a groove contains two or even more windings. This applies to each groove. The two or more windings within one groove are magnetically coupled, and can for instance be used as coupled inductors or a transformer. But in accordance with the principles of the present invention, the one or more windings of one groove are not coupled to the one or more windings in the other groove: these two groups of windings are magnetically separated by the magnetic short-circuiting between the separation disc portion 111, 211, 311 and the shell component 150, 250, 350. By way of example, FIG. 8 schematically shows a fourth embodiment of a multiple inductive component 400 according to the present invention. Identical or similar parts are indicated with the same reference numerals as used in FIG. 5 for indicating parts of the first embodiment, yet increased by 300 to be in the 400 range, therefore the discussion of these parts will not be repeated. In this embodiment, the first groove 431 contains three windings 441a, 441b, 441c of a transformer, which are separate from a winding 442 in the second groove 432.

Figure 9:
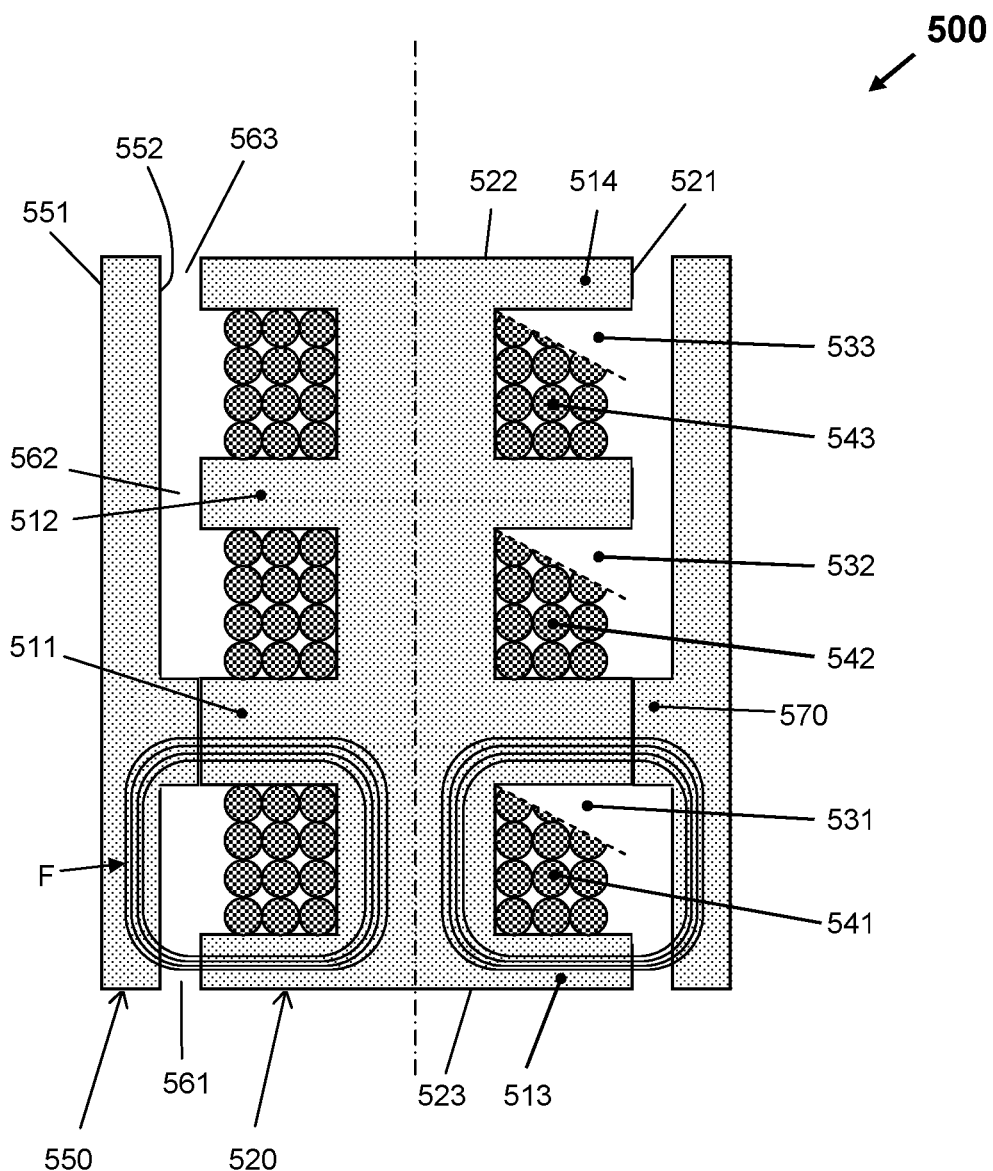
FIG. 9 schematically shows a fifth embodiment of a multiple inductive component according to the present invention.

In the second place, it is possible that the drum core comprises three or even more grooves with windings, each groove containing one or more windings as explained above. By way of example, FIG. 9 schematically shows a fifth embodiment of a multiple inductive component 500 according to the present invention. Identical or similar parts are indicated with the same reference numerals as used in FIG. 5 for indicating parts of the first embodiment, yet increased by 400 to be in the 500 range, therefore the discussion of these parts will not be repeated. In this embodiment, with respect to the first embodiment 100, the drum core 520 has been extended and comprises a third groove 533 adjacent the second groove 532 opposite the first groove 531. The third groove 533 contains a third winding 543. The drum core portion between the second and third grooves 532, 533 is indicated as second disc portion 512, and the drum core portion at the opposite side of the third groove 533 is indicated as third disc portion 514, which is now the upper outer disc portion. Second and third air gaps 562, 563 are present between the cylinder shell 550 and the second and third disc portions 512, 514, respectively. The second and third windings 542, 543 are magnetically coupled to each other; they may constitute for instance coupled inductors, or a transformer. They are however magnetically independent from the first winding 541.

It is noted that the drum core component 520 may also comprise further grooves with windings adjacent the first groove 531, i.e. at the lower side of the first groove 531 in the drawing.

It is noted that the embodiments of FIGS. 8 and 9 are based on a core shell component with an internal projection 470, 570 and can thus be compared to the embodiment of FIG. 6, but embodiments comparable to FIG. 5 or 7 are of course also possible.

In the above, by way of illustrative example, a switch-mode converter has been discussed of a design having two power stages with two independent inductors. It is to be noted, however, that switch-mode converters are not the only type of device comprising two (or more) inductive components where it is desirable to reduce the volume of the inductive components, and the present invention would be applicable in other types of devices as well. It is further to be noted that electronic devices such as for instance switch-mode converters may comprise filter stages including one or more inductors, and/or may comprise resonant stages including one or more inductors, and/or may comprise one or more transformers, and the present inventive multiple inductive component can be used to constitute such inductive components as well.

Summarizing, the present invention provides a multiple inductive component 100 which comprises:
- a cylindrical drum core component 120 with at least two axially spaced circumferential grooves 131, 132 in its cylindrical outer surface 121, a separation disc portion 111 between said two circumferential grooves and two outer disc portions 112, 113 at the sides of the said two circumferential grooves, respectively, directed away from the separation disc portion;
- at least one first winding 141 arranged in a first one 131 of said grooves;
- at least one second winding 142 arranged in a second one 132 of said grooves;
- a cylindrical shell core component 150 arranged coaxially around the cylindrical drum core component;
- two outer air gaps 162, 163 between the cylindrical shell core component and said two outer disc portions, respectively.

The separation disc portion is magnetically short circuited with the cylindrical shell core component.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims. In the claims, the wording "multiple inductive component" will be used to also include "dual inductive component".

For instance, it is possible to have an embodiment in which the separation disc portion has a diameter larger than the outer disc portions, combined with the presence of an annular ring component or a shell core component having a central radial projection on its inner surface, or both. It is also possible to have an embodiment in which the shell core component has a central radial projection on its inner surface, combined with the presence of an annular ring component or a drum core component having a central portion with an increased diameter, or both.

In the first embodiment, the annular core component may be kept in place by suitable means, for instance by being clamped or glued on the drum component or by being clamped or glued in the shell component.

In the above examples, the cylindrical shell core component is shown as having the same axial length as the cylindrical drum core component. This is, however, not essential for implementing the present invention, and with a view to shielding purposes it may even be advantageous if the axial length of the cylindrical shell core component is larger than the axial length of the cylindrical drum core component.

In the above examples, the outer disc air gaps are shown as having mutually the same width, and the same applies to the air gaps of possible drum discs outside the separation disc that is short circuited with the cylinder in accordance with the invention. This is, however, not essential for implementing the present invention, and in some designs different air gap sizes may even be beneficial.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Even if certain features are recited in different dependent claims, the present invention also relates to an embodiment comprising these features in common. Any reference signs in the claims should not be construed as limiting the scope.

The invention claimed is:
1. A device, comprising:
   a cylindrical drum core component with a cylindrical outer surface and at least two axially spaced circumferential grooves in the cylindrical outer surface, the cylindrical drum core component comprising a separation disc portion between the at least two axially spaced circumferential grooves and two outer disc portions at the sides of the at least two axially spaced circumferential grooves, respectively, directed away from the separation disc portion;

a first winding arranged in a first axially spaced circumferential groove;

second winding arranged in a second axially space circumferential groove;

a cylindrical shell core component arranged coaxially around the cylindrical drum core component;

an annular core component disposed between the cylindrical shell core component and the separation disc portion of the cylindrical drum core component; and two outer air gaps between the cylindrical shell core component and the two outer disc portions, respectively, wherein the separation disc portion is (i) magnetically short circuited with the cylindrical shell core component, or (ii) separated from the cylindrical shell core component by a central air gap narrower than a narrowest air gap of the two outer air gaps such that the first winding and the second winding are magnetically separated.

2. The device of claim 1, wherein the annular core component is formed with the cylindrical drum core component.

3. The device of claim 1, wherein an outer diameter of the separation disc portion of the drum core component is equal to or less than an inner diameter of the cylindrical shell core component at an axial position of the separation disc portion.

4. The device of claim 3, wherein the outer diameter of the separation disc portion is larger than an outer diameter of a smallest one of the two outer disc portions, and wherein the outer diameter of the separation disc portion is larger than an outer diameter of a largest one of the two outer disc portions.

5. The device of claim 3, wherein, at an axial position of the separation disc portion, the cylindrical shell core component comprising an inner surface that includes an inward annular projection.

6. The device of claim 5, wherein an inner diameter of the inward annular projection of the cylindrical shell core component is larger than an outer diameter of a smallest one of the two outer disc portions, and wherein an inner diameter of the inward annular projection of the cylindrical shell core component is larger than an outer diameter of the largest one of the two outer disc portions.

7. The device of claim 1, wherein at least one of the axially spaced circumferential grooves contains two or more windings.

8. The device of claim 1, further comprising at least one separate groove containing one or more windings.

9. The device of claim 1, comprising a first inductive component and a second inductive component operating independently from each other, wherein the first winding corresponds to the first inductive component and the second winding corresponds to the second inductive component.

10. The device of claim 9, wherein the first inductive component is one of an inductor of a power stage, an inductor of a filter stage, an inductor of a resonant stage, a transformer, and a coupled inductor, and wherein the second inductive component comprises at least one of an inductor of a power stage, an inductor of a filter stage, or is an inductor of a resonant stage, a transformer, and a coupled inductor.

11. The device of claim 1, further comprising a switch-mode converter.

12. The device of claim 11, further comprising:
a power factor correction (PFC) stage including a first inductor and a DC/DC stage including a second inductor operating independently from the first inductor, wherein the first winding corresponds to the first inductor and the second winding corresponds to the second inductor.

13. The device of claim 11, further comprising: a light emitting diode (LED) driver including the switch-mode converter.

14. The device of claim 13, further comprising: an LED retrofit lamp including the LED driver.

15. A device, comprising:
a cylindrical magnetic drum core component with a cylindrical outer surface and two axially spaced circumferential grooves in the cylindrical outer surface;

a separation disc portion between the at least two circumferential grooves;

two outer disc portions adjacent to the two circumferential grooves, respectively, directed away from the separation disc portion;

a first electrically conductive winding disposed in a first circumferential groove;

a second electrically conductive winding disposed in a second circumferential groove;

a cylindrical magnetic shell core component arranged coaxially around the cylindrical magnetic drum core component;

an annular core component between the cylindrical magnetic shell core component and the separation disc portion of the cylindrical magnetic drum core component; and two outer air gaps between the cylindrical magnetic shell core component and the two outer disc portions, respectively, wherein the separation disc portion is magnetically short circuited with the cylindrical magnetic shell core component such that the first electrically conductive winding and the second electrically conductive winding are magnetically separated from each other.

16. The device of claim 15, wherein the annular core component is formed to the cylindrical magnetic shell core component or the cylindrical magnetic drum core component.

17. The device of claim 15, comprising a first inductive component and a second inductive component operating independently from each other, wherein the first electrically conductive winding corresponds to the first inductive component and the second electrically conductive winding corresponds to the second inductive component.

18. A device, comprising:
a cylindrical drum core component with a cylindrical outer surface and at least two axially spaced circumferential grooves in the cylindrical outer surface, the cylindrical drum core component comprising a separation disc portion between the at least two axially spaced circumferential grooves and two outer disc portions at the sides of the at least two axially spaced circumferential grooves, respectively, directed away from the separation disc portion;

a first winding disposed in a first axially spaced circumferential groove;

a second winding disposed in a second axially spaced circumferential groove;

a cylindrical shell core component arranged coaxially around the cylindrical drum core component;

an annular core component extending from the cylindrical shell core component or the separation disc portion of the cylindrical drum core component; and two outer air gaps between the cylindrical shell core component and the two outer disc portions, respectively, wherein
(i) the separation disc portion is magnetically short circuited with the cylindrical magnetic shell core component such that the first winding and the second winding are magnetically separated from each other,
(ii) an inner surface of the cylindrical shell core component is provided with an inward annular projection, and
(iii) an inner diameter of the inward annular projection of the cylindrical shell core component is larger than an outer diameter of a smallest one of the two outer disc portions and larger than the outer diameter of a largest one of the two outer disc portions.

19. The device of claim 18, wherein the annular core component is part of the cylindrical shell core component.

20. The device of claim 18, wherein the annular core component is part of the cylindrical drum core component.

\* \* \* \* \*